C. H. WASHBURNE.
VEHICLE.
APPLICATION FILED OCT. 15, 1909.
976,413.
Patented Nov. 22, 1910.
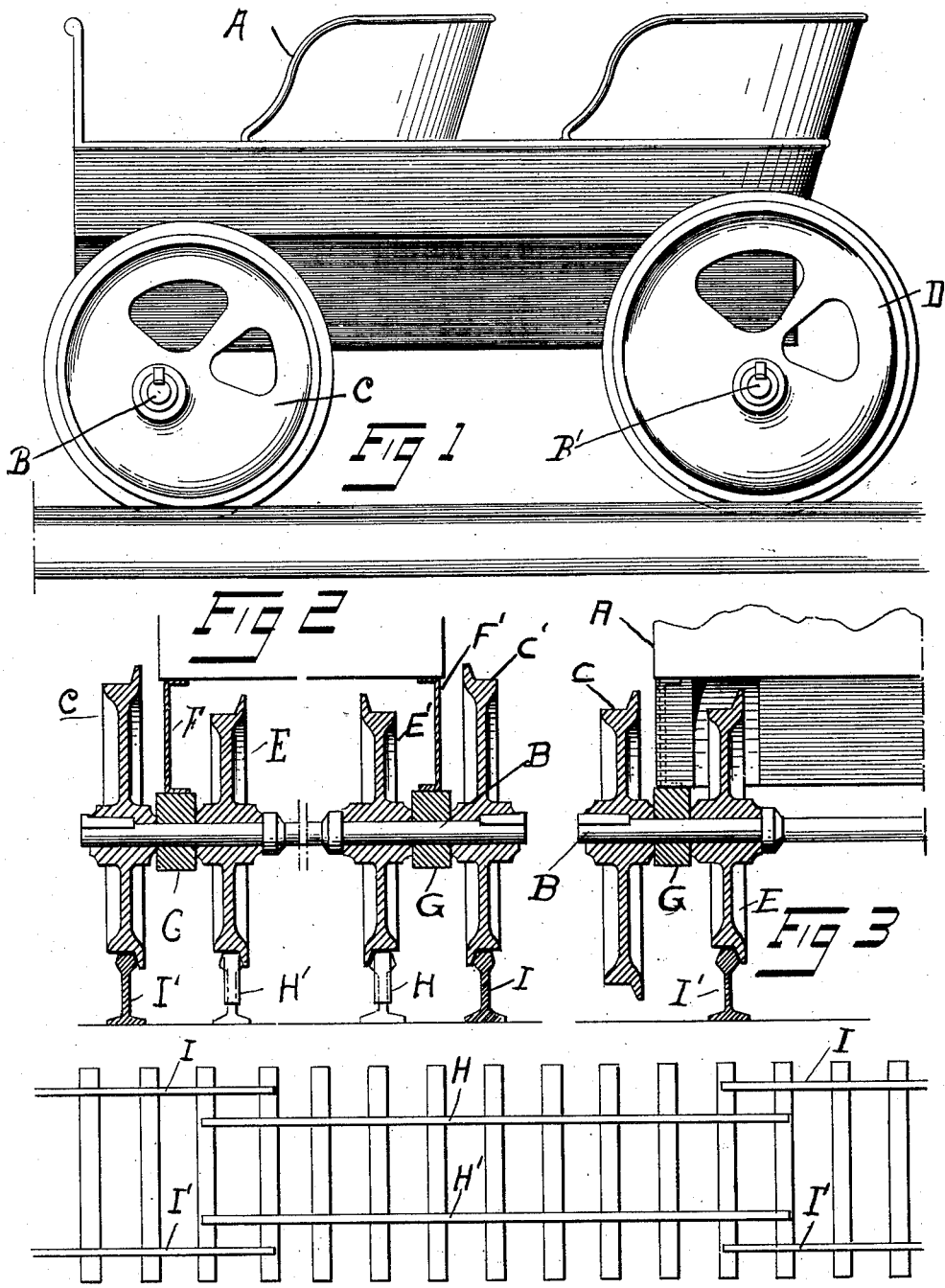

UNITED STATES PATENT OFFICE.

CHARLES H. WASHBURNE, OF ROCHESTER, NEW YORK, ASSIGNOR OF ONE-HALF TO HENRY B. OAKMAN, OF NEW YORK, N. Y.

VEHICLE.

976,413.  Specification of Letters Patent.  Patented Nov. 22, 1910.

Application filed October 15, 1909. Serial No. 522,767.

*To all whom it may concern:*

Be it known that I, CHARLES H. WASHBURNE, a citizen of the United States, and a resident of Rochester, in the county of Monroe and State of New York, have invented certain new and useful Improvements in Vehicles, of which the following is a specification.

My invention relates to wheeled vehicles and the object of my invention is to provide a vehicle to be operated by gravity and adapted to run on rails and carry one or more persons.

A further object is to provide a vehicle which will contribute to the amusement of the passenger and which may run either smoothly or with a constantly changing movement.

Referring to the drawings which form part of this specification Figure 1. is a side view of a car illustrating a vehicle provided with a body having seats for a number of passengers and provided with a plurality of wheels, arranged in sets, one set being mounted concentric with the axle, and one set eccentric thereto, the rear eccentric wheels being of greater diameter than the front eccentric wheels. Fig. 2. is a view showing one of the axles with four wheels mounted thereon and illustrated by a cross sectional view, the two outer wheels resting on the outer rails and the two inner wheels about to contact with the inner rails. Fig. 3. is a view, partly in section, showing the inner wheels resting on the inner rails. Fig. 4. is a plan view of the ties and rails mounted thereon and disclosing the arrangement of the rails to permit the car to travel from the inner rails to the outer ones and vice versa.

A indicates the car body, B and B' the axles, C and C' front eccentric wheels, D, a rear eccentric wheel, which, in this case is shown as having a greater diameter than wheels C and C'; and E and E' indicate two of the inner wheels which are mounted on the axles B and B' in pairs and the treads of which are concentric thereto, the wheels being free to rotate on the axles.

The two pair of wheels C and D are keyed to their respective axles B and B' and the car body is mounted above the inner wheels and supported by depending brackets F and F' which are fastened to the tops of the boxes G, H and H' indicate the two inner rails and I and I' the two outer rails, the ends of each of which are bent downward as illustrated in Fig. 2, on the inner rails, to permit the car to engage and pass out one set from the other without too much shock in making the transfer.

The operation is as follows: Assuming the car to be resting on the inner rails, and passengers in the car, and a slight down grade. The car will start by gravity and run smoothly forward until the ends of the inner rails are reached and the eccentric wheels engage the outer rails when the car body will begin to move up and down and continuously change its movement as the front and back wheels change their positions relative to each other, and as one set may be larger than the other, this difference in diameter will cause this action to be positive. It is obvious that a vehicle can be provided with but a single wheel at each end and adapted to run on a single rail that would also afford amusement and be within the scope of my invention.

If desired I may make the front and rear eccentric wheels of the same diameter, and in some cases I prefer to do so. The wheels are flanged as indicated and special description of this feature is not deemed necessary as it is well understood in the art.

Having thus described my invention what I claim as new and desire to secure by Letters Patent is,

1. A vehicle having a body and axle, and four traction wheels, two of which are mounted on said axle with their treads concentric thereto, and two of which are mounted with their treads eccentric thereto.

2. A vehicle having a body, and two axles, two traction wheels mounted on each of said axles and having their treads concentric therewith, and two traction wheels mounted on each of said axles and having their treads mounted eccentric thereto.

3. A vehicle having a body and two axles, two wheels mounted on each of said axles and having their treads concentric therewith, and two mounted on each of said axles and having their treads mounted eccentric thereto, two of said last named wheels being of greater diameter than the other two eccentric wheels.

4. A vehicle having a body with two axles and eight traction wheels, four wheels being mounted on each axle, two mounted on each axle with their treads concentric therewith and two mounted with their treads eccentric thereto, two each of the concentric wheels being mounted in alinement with each other and two each of the eccentric wheels being mounted in alinement with each other, said axles being constructed to be independently rotated.

Signed at Rochester in the county of Monroe and State of New York this 18th day of September A. D. 1909.

CHARLES H. WASHBURNE.

Witnesses:
KENDRICH D. WELGUS,
A. LAVERNE NASH.